R. G. ROULSTONE.
HUB ATTACHING DEVICE.
APPLICATION FILED FEB. 29, 1908.

935,061.

Patented Sept. 28, 1909.

Rip G. Roulstone.
Inventor

Witnesses

By
Attorneys

UNITED STATES PATENT OFFICE.

RIP G. ROULSTONE, OF McKENZIE, TENNESSEE.

HUB-ATTACHING DEVICE.

935,061.

Specification of Letters Patent. Patented Sept. 28, 1909.

Application filed February 29, 1908. Serial No. 418,596.

*To all whom it may concern:*

Be it known that I, RIP G. ROULSTONE, a citizen of the United States, residing at McKenzie, in the county of Carroll and State of Tennessee, have invented a new and useful Hub-Attaching Device, of which the following is a specification.

This invention relates to bearings for vehicle wheels, and has for its object to provide a means for retaining the wheel on an axle spindle without the employment of the usual nut or cap.

A further object of this invention is to lessen the friction between the hub and spindle by providing a ball bearing surface, the balls performing the double function of reducing the friction and of retaining the wheel on the spindle.

Still another object of this invention is to provide a novel means for retaining the balls in their respective grooves, the means forming a continuation of the grooves.

With these and other objects in view, as will more fully hereinafter appear, the invention consists in certain novel features of construction and arrangement of parts, hereinafter fully described, illustrated in the accompanying drawings, and particularly pointed out in that portion of this instrument wherein patentable novelty is claimed for certain distinctive and peculiar features of the device, it being understood that, within the scope of what hereinafter thus is claimed, various changes in the form, proportions, size and minor details of the structure may be made without departing from the spirit or sacrificing any of the advantages of the invention.

Figure 1:
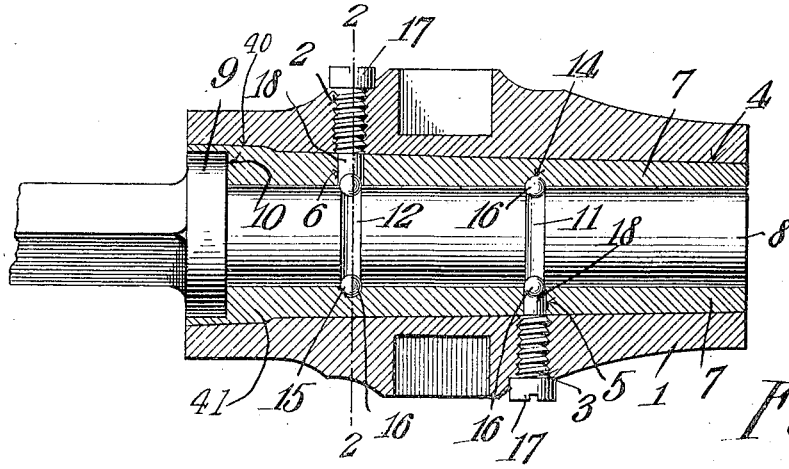
Figure 2:
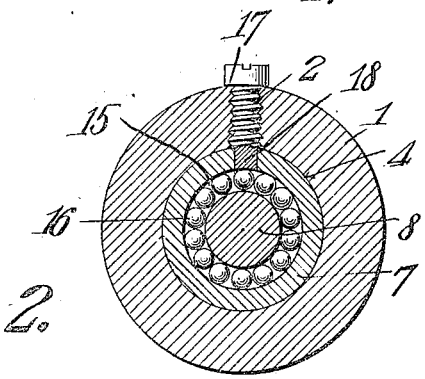
Figure 3:
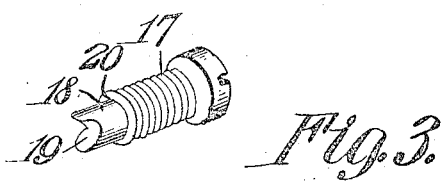

In the accompanying drawings:—Figure 1 is a longitudinal sectional view, parts being in elevation. Fig. 2 is a transverse section on the line 2—2 of Fig. 1. Fig. 3 is a perspective of the retaining bolt.

Similar numerals of reference are employed to indicate corresponding parts throughout the several figures of the drawings.

1 designates a hub of ordinary type with radial threaded apertures 2 and 3 extending inwardly from the outer surface and terminating in the bore 4, and alining with apertures 5 and 6 in the spindle sleeve 7. The apertures of the spindle sleeve are of considerably less diameter than those of the hub for a purpose to be later explained.

The outer face of the sleeve is tapered and in its bore 13 are formed the grooves 14 and 15 intersecting the apertures 5 and 6. The spindle sleeve bore is of a sufficient diameter to freely accommodate the shaft spindle 8, the latter having a collar 9 formed thereon, the face of which abuts against a shoulder 10 formed on the inner end of the spindle sleeve 7. Alining with the apertures in the spindle sleeve and the grooves 14 and 15 of the latter are grooves 11 and 12 formed in the spindle and accommodating one hemisphere of the ball 16, the opposite hemisphere fitting in the grooves 14 and 15 of the spindle sleeve. When the balls are in their respective grooves it is obvious that lateral movement of the sleeve is prevented both outwardly and inwardly by the balls abutting against the sides of the grooves of the spindle and sleeve.

The screw members 17 are threaded for a portion of their length and terminate in reduced ends 18 and are provided with the usual heads at one end, and formed in the opposite end are recesses 19. The function of the recess is to overlie the balls, thereby providing an uninterrupted groove in the spindle sleeve, the reduced portion 18 being of a diameter to snugly fit the apertures 5 and 6 in the spindle sleeve, the shoulder 20 contacting with the outer surface of said sleeve. Another function of the screw is to key the hub to the sleeve which is obvious when the screw is threaded into the apertures of the hub 1, the shoulder resting on the surface of the sleeve, the reduced portion entering into the apertures 5 and 6, and the groove or recess overlying the balls. With this arrangement the hub and sleeve will revolve about the spindle, the balls performing the function of an end nut or cap. The axial bore of the hub is terminally enlarged adjacent the inner end of the hub as denoted by the numeral 40, the sleeve being provided, adjacent its inner end, with a shoulder 41, which is adapted to engage the enlarged portion 40 of the axial bore of the hub to limit the radial apertures of the sleeve and of the hub to position in alinement.

I claim:—

A device of the class described comprising a hub having a tapering axial bore terminally enlarged adjacent the inner end of the hub; a tapering spindle sleeve arranged to be inserted in the bore of the hub; the hub being provided with radial, oppositely disposed, threaded apertures spaced apart longitudinally of the hub; the spindle sleeve being provided with unthreaded apertures of less diameter than the apertures in the hub and arranged to be brought into alinement therewith; the spindle-sleeve being provided with a shoulder adjacent its inner end to engage the enlarged portion of the axial bore of the hub to aline the apertures of the sleeve with those of the hub; the sleeve being provided in its inner face with circumscribing grooves intersecting the apertures in the sleeve; the bore of the sleeve being enlarged at its inner end to form a shoulder; a spindle arranged to be inserted into the sleeve and provided with circumscribing grooves arranged to be brought into alinement with the grooves in the sleeve; the spindle having its outer end flush with the outer ends of the sleeve and the hub and being provided at its inner end with a collar arranged to be housed within the contour of the sleeve in the enlarged portion of the bore thereof and to abut against the shoulder formed by said enlarged portion, to aline the grooves of the spindle with the grooves of the sleeve; balls located in the alined grooves of the spindle and the sleeve; members headed to engage the outer surface of the hub and threaded to engage the apertures in the hub; the said members terminating in smooth, reduced ends to register in the apertures in the sleeve, the difference in the diameter of the portions of said members determining a shoulder to engage the outer surface of the sleeve; the inner faces of the reduced ends being recessed to conform to the grooves in the sleeve.

In testimony that I claim the foregoing as my own, I have hereto affixed my signature in the presence of two witnesses.

RIP G. ROULSTONE.

Witnesses:
    TURNER CANNON,
    JEFF. D. PATE.